Aug. 15, 1961  J. WOLKOFF  2,996,375
PROCESS OF RECOVERING ALKALI METALS
Filed June 11, 1958
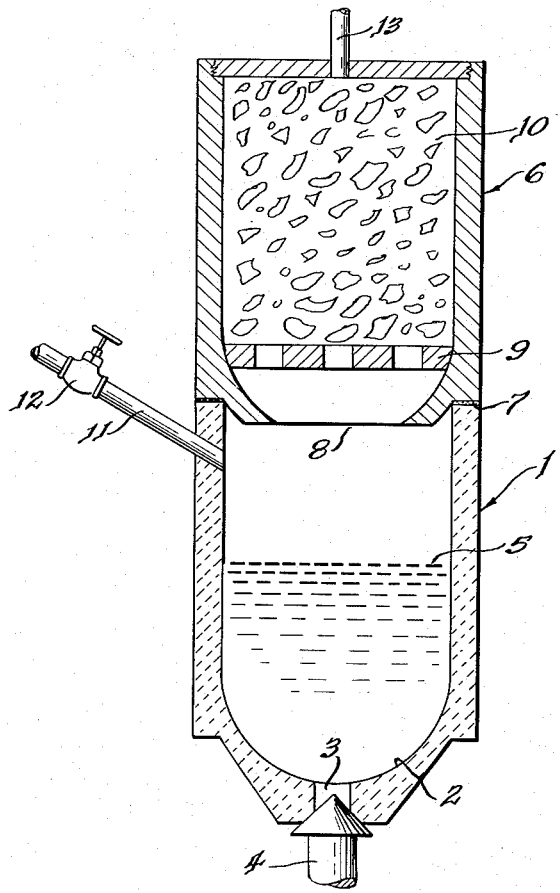
INVENTOR.
Jasper Wolkoff
BY
Roland G. Anderson
Attorney United States Patent Office 2,996,375
Patented Aug. 15, 1961

2,996,375
PROCESS OF RECOVERING ALKALI METALS
Jasper Wolkoff, Park Forest, Ill., assignor to the United States of America as represented by the United States Atomic Energy Commission
Filed June 11, 1958, Ser. No. 741,435
10 Claims. (Cl. 75—66)

This invention deals with a process of removing and recovering alkali metals from a mixture with other metals. The process of this invention is particularly applicable to neutron-irradiated uranium, or other fissionable material, such as plutonium, which contains alkali metals together with other fission products, and it represents a preparatory step to be used prior to the regeneration proper of the uranium.

Pyrometallurgical processes are among the methods used for regenerating uranium after bombardment with neutrons in neutronic reactors. In one of the processes the uranium is melted in a crucible of a refractory oxide, such as zirconia or magnesia, at a temperature between 1150 and 1400° C. whereby most of the fission products are oxidized by the crucible material and separated from the metallic uranium in the form of a slag. This process is covered by U.S. Patent No. 2,822,260, granted to Harold M. Feder and Norman R. Chellew on February 4, 1958.

The process just described has the disadvantage that some fission products volatilize under the conditions used and then recondense in cooler parts of the apparatus, such as pipe lines; this eventually can cause clogging of the pipe lines. Furthermore, the escape of radioactive vapor from the melting device represents a health hazard and therefore requires elaborate shielding and confining equipment which in turn increases the expense of the process considerably. Alkali metals, for instance cesium and rubidium, are an essential ingredient of volatile fission products.

The problem just described exists particularly when irradiated fuel elements are to be processed which were decanned in loose-fitting stainless steel tubes where the annular space between fuel element and tube was filled with an alkali metal for heat-conducting purposes. Such fuel elements, after decanning, hold a considerable amount of alkali metal on their surface which is responsible for the development of a great amount of radioactive vapor during refining. For instance, one such fuel element, after removal of the stainless steel tube, was found to contain, per 10 kg. of neutron-bombarded uranium mass, 44 g. of sodium on the surface and, admixed with the uranium, 20 g. of total cesium and 1½ g. of total iodine. Fuel elements of the type just described are used in experimental breeder reactors.

Furthermore, the volatilization of fission products often represents an undesirable loss. This is particularly true for isotope $Cs^{137}$ which has a half-life of 30 years and is a rather constant source of gamma and beta rays and therefore can be used, for instance, for sterilizing food, for polymerizing hydrocarbons, in atomic batteries, in teletherapy and radiography.

It is an object of this invention to provide a process of removing and recovering alkali metals from a mixture with other metals by which the disadvantages enumerated above are overcome.

It is thus an object of this invention to provide a process of separating alkali metals from a mixture with other metals by volatilization wherein practically no condensation in the pipe lines of the equipment takes place.

It is also an object of this invention to provide a process of separating alkali metals from neutron-irradiated uranium which requires a minimum of shielding and is comparatively inexpensive.

It is finally also an object of this invention to provide a process of recovering volatile fission products from neutron-irradiated uranium with a high degree of efficiency.

It has been found that certain materials adsorb and retain alkali metal vapors when at a temperature considerably above condensation; the process is based on adsorption rather than on condensation. Materials having this property and thus being suitable for this process are commercially available surface-active adsorbents, e.g. activated alumina including activated bauxite, activated carbon, dehydrated zeolite of high surface activity (calcium or sodium aluminum silicate) known also as "Molecular Sieves," activated magnesia and fuller's earth.

Also silver chloride and cuprous chloride, alone or deposited on surface-active adsorbents, uranium tetrafluoride and zinc fluoride were found to be operative. For most metals the silver chloride and copper chloride have to be deposited on a carrier, though, on account of their relatively low melting points and of the high temperature required in the system. The chemism involved in the "reaction" of these two latter materials with the alkali metal vapor is not known. Fluorides which react chemically with alkali metal, such as aluminum fluoride and iron fluoride, were also found suitable.

Refractory oxides, such as refractory magnesium oxide, refractory zirconium oxide, refractory aluminum oxide, and likewise diatomaceous earth and silica gel were found not to be operative. Consequently it has to be assumed that surface activity is not the important factor, or not the only important factor, that determines suitability of a material as an alkali-metal-vapor remover or "getter."

The process of this invention thus comprises melting the metal mixture, holding it at a temperature at which said alkali metal escapes in the form of vapor, and contacting said alkali metal vapor with a surface-active material having a temperature above the dew point of said alkali metal whereby said alkali metal vapor is adsorbed by said surface-active material.

If neutron-bombarded uranium, for instance a "decanned" fuel element used in the experimental breeder reactor, is to be treated, the fuel element, according to this invention, is first maintained at elevated temperature and preferably under reduced pressure, whereby the alkali metal held on the surface of the fuel element is transformed into vapor; the alkali metal vapor is then contacted with the surface-active material of this invention, whereby it is adsorbed thereon; the uranium is then melted at atmospheric pressure, whereby volatile fission products, including cesium and rubidium, escape; and the gaseous mixture is then contacted immediately with the heated surface-active material whereby the alkali metal vapors are adsorbed thereon.

The fission products that volatilize from neutron-irradiated uranium at a melting temperature up to about 1400° C., the highest temperature normally used in the refining and regeneration of uranium, are essentially xenon, cesium, barium, tellurium, strontium, iodide, cadmium, krypton and rubidium; this listing is in the order of decreasing abundance.

The getters of this invention are advantageously subjected to a degassing process prior to use. This may be accomplished, for instance, by heating the getter material to a temperature of between about 400 and 650° C. and either evacuating until the pressure has fallen to about 0.1 mm. Hg or less, or sweeping an inert gas through it.

If the material to be treated is a neutron-irradiated uranium or plutonium with alkali metal on its surface as described above, outside heating is usually not necessary for the volatilization of this alkali metal, because the nuclear decay taking place in the metal brings the temperature up to a sufficiently high degree to obtain vaporization of the alkali metal. The pressure should not be lower than 1 mm. Hg in order to avoid vaporization of the adsorbed alkali metal from the getter.

The temperature for removing fission products, of course, is dependent on the melting point of the metal to be treated; it has to be above the melting point of the metal, and it also has to be above the boiling point of the alkali metal to be removed. In the case of neutron-irradiated uranium the temperature should be between 1150 and 1400° C., but preferably between 1300 and 1400° C.

The melting step can be carried out at atmospheric pressure. An inert atmosphere is preferable to air on account of the high affinity of uranium to oxygen; argon gas was found to be a suitable medium therefor. The argon atmosphere can be static, or a current of argon gas can be steadily passed through the apparatus; a static atmosphere is preferred.

In the melting of neutron-irradiated uranium the noble gases xenon and krypton come off first. They are swept out of the system with an inert gas into a storage vessel whence they are discharged, after storage for decay, as a diluted mixture with the inert gas, into the atmosphere at a controlled rate.

The temperature of the getter has to be above the dew point of the alkali metal to be removed and/or recovered, so that the vapor does not condense or liquefy thereon and thereby clog the pores of the surface-active material.

The getter materials suitable for the process of this invention and listed previously have an unexpectedly high capacity for the alkali metal vapor at the elevated temperatures used. For instance, at 800° C. activated alumina and dehydrated zeolite were found to adsorb 20% of their weight of sodium vapor and activated carbon 40%. Thus activated carbon had the best adsorption capacity. However, when it comes to retention of the adsorbed alkali metal, the activated alumina gives by far the best results. When beds of the getter materials loaded with from 17 to 20% by weight of sodium were evacuated to about 1 mm. Hg absolute pressure for one hour at 800° C., the activated carbon retained 13% of the adsorbed sodium, the zeolite 44% and the alumina 66%. With a sodium charge considerably below the above amounts, for instance with a charge of from 5 to 12%, the sodium retention was between 95 and 100% of that adsorbed in the case of both zeolite and activated alumina.

If the adsorbed alkali metal is to be recovered, which is mostly the case for cesium, it is best to use the high-capacity, low-retention activated carbon, because the adsorbed alkali metal can then be recovered from the getter by simultaneous evacuation and heating. It is understood, though, that other methods can be used for the recovery of the adsorbed alkali metal, for instance the alkali metal can be dissolved by a suitable solvent known to those skilled in the art. The recovery of the adsorbed material per se is not part of this invention.

The process of this invention can be carried out in a simple and inexpensive device, no specific apparatus being required. A diagrammatic, longitudinal, sectional view of an apparatus that has been successfully used for carrying out the process of this invention is shown in the accompanying drawing.

In this drawing reference numeral 1 indicates a crucible of a refractory material, such as magnesia or zirconia, which has a round bottom 2 provided with an opening 3. A stopper 4 fits into the opening 3 for closing the crucible. The metal to be treated, indicated by reference numeral 5, is held by said crucible. On top of the crucible there is arranged a cover or trap 6 which is sealed to the crucible by a cement 7 or other suitable means. This cover has a large opening 8 in its bottom and a sieve or screen 9 above said opening. This sieve serves as a support for the getter material 10 and also as a connection between the crucible 1 and the cover 6 so that the escaping vapors will contact the getter material.

The crucible 1 is provided with an inlet pipe 11 having a valve 12 which can be connected with a source of inert gas (not shown). On the upper end of the cover there is arranged an outlet pipe 13 which can be connected with a vacuum. The entire device may be heated, for instance by induction coils (not shown). It will be obvious to those skilled in the art that devices other than that just described can be used for the process of this invention.

In the following, two examples will be given to illustrate the process of this invention.

*Example I*

Three runs were made each time using a bed with a different getter. For each run a current of argon gas was saturated with sodium vapor by bubbling the gas through a shallow bath of sodium. The sodium-laden gas was then passed through the bed; the getter was held at a temperature of about 800° C. The beds were 1 inch deep and had a diameter of 13/16 inch. The current was passed through the bed from the top to the bottom; its flow rate was 50 ml./min. (STP). At breakthrough the activated alumina had adsorbed 24% of its weight of sodium, the dehydrated zeolite about 20% and the activated carbon about 42%.

*Example II*

Runs similar to those described in Example I were carried out under identical conditions but with cesium vapor. The activated carbon showed an adsorption of 105.8% by weight before the breakthrough had been reached; this was when the cesium supply available for this run had been completely vaporized. The dehydrated zeolite showed an adsorption of 27.7% at breakthrough.

It will be understood that the process of this invention is applicable to the recovery of alkali metals from metal mixtures or alloys other than neutron-irradiated uranium or plutonium.

It will also be understood that this invention is not to be limited to the details given herein, but that it may be modified within the scope of the appended claims.

What is claimed is:

1. A process of recovering alkali metal from vapor, comprising contacting said alkali metal vapor with a surface-active adsorbent selected from the group consisting of activated alumina, activated carbon, dehydrated zeolite, activated magnesia and fuller's earth, said adsorbent having been preheated to a temperature above the vaporization point of said alkali metal whereby said alkali metal vapor is adsorbed by said surface-active adsorbent, and heating said surface-active adsorbent under vacuum whereby said alkali metal is isolated.

2. The process of claim 1 wherein the surface-active adsorbent prior to use is evacuated at a temperature of between 400 and 650° C. until the pressure is at most 0.1 mm. Hg.

3. The process of claim 1 wherein the surface-active adsorbent prior to use is treated with a current of inert gas at a temperature of between 400 and 650° C.

4. A process of recovering alkali metal fission products from neutron-irradiated fissionable material containing said alkali metal fission products, comprising melting said fissionable material in an inert atmosphere, maintaining said fissionable material at a temperature whereby said alkali metal fission products volatilize in the form of vapor, immediately contacting said vapor with a getter which has been preheated to a temperature above the dew point of the alkali metal and which has been selected from the group consisting of activated alumina, activated carbon, dehydrated zeolite, activated magnesia and fuller's earth whereby said vapor is adsorbed on said getter and removing said alkali metal from said getter by heating under reduced pressure.

5. The process of claim 4 wherein the fissionable material is uranium and melting is carried out at between 1300 and 1400° C.

6. A process of removing alkali metal from neutron-irradiated fissionable fuel elements containing therein cesium and other fission products and having part of said alkali metal on their surface, comprising maintaining said neutron-irradiated elements at a temperature of at least 600° C. under subatmospheric pressure whereby the alkali metal held on the surface is transformed into vapor; contacting the alkali metal vapor with a surface-active adsorbent selected from the group consisting of activated alumina, activated carbon, dehydrated zeolite, activated magnesia and fuller's earth, said adsorbent having been preheated to a temperature above the dew point of the alkali metal whereby it is adsorbed thereon; melting the fuel elements whereby volatile fission products including cesium evaporate; contacting said volatile fission products with a surface-active adsorbent selected from the group consisting of activated alumina, activated carbon, dehydrate zeolite, activated magnesia and fuller's earth, which adsorbent has been preheated to a temperature above the dew point of cesium whereby cesium is adsorbed thereon, and heating said surface-active adsorbent under reduced pressure whereby said cesium is isolated.

7. The process of claim 6 wherein the fuel elements are uranium.

8. The process of claim 6 wherein the subatmospheric pressure is at least 1 mm. Hg.

9. The process of claim 7 wherein the molten uranium is maintained at a temperature of between 1150 and 1400° C. in an inert atmosphere and at atmospheric pressure.

10. The process of claim 9 wherein the temperature ranges between 1300 and 1400° C. and the inert atmosphere is argon.

References Cited in the file of this patent

UNITED STATES PATENTS

| | | |
|---|---|---|
| 2,271,023 | Nelson | Jan. 27, 1942 |
| 2,685,346 | Deyrup et al. | Aug. 3, 1954 |
| 2,836,633 | Esmay et al. | May 27, 1958 |

FOREIGN PATENTS

| | | |
|---|---|---|
| 666,869 | Great Britain | Feb. 20, 1952 |

OTHER REFERENCES

Catalysis, vol. 1, edited by Paul H. Emmett, Reinhold Publishing Co., 1954; pp. 318 thru 321 relied on.